No. 821,962. PATENTED MAY 29, 1906.
R. G. RATE.
CORN HUSKER.
APPLICATION FILED OCT. 6, 1905.
3 SHEETS—SHEET 1.
Fig. 1.
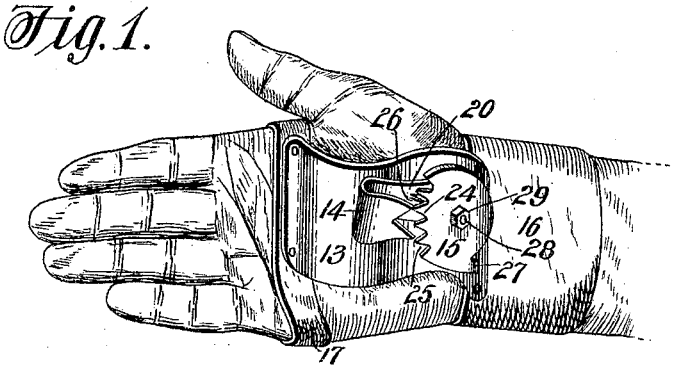
Fig. 2.
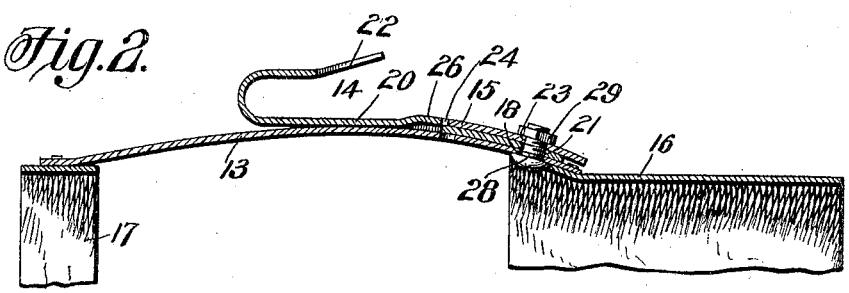
Fig. 3.
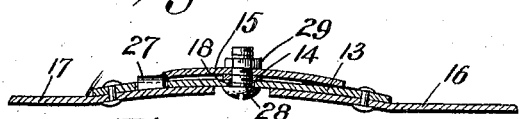
Fig. 5. Fig. 4. Fig. 6.
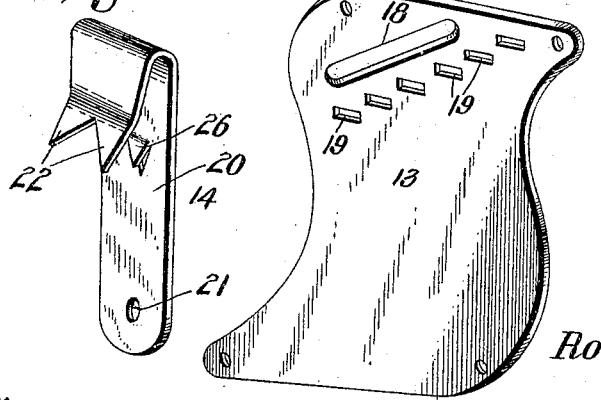 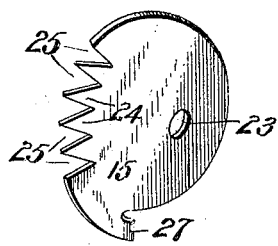
Robert G. Rate, Inventor
Witnesses
By
Attorney No. 821,962. PATENTED MAY 29, 1906.
R. G. RATE.
CORN HUSKER.
APPLICATION FILED OCT. 6, 1905.
3 SHEETS—SHEET 2.
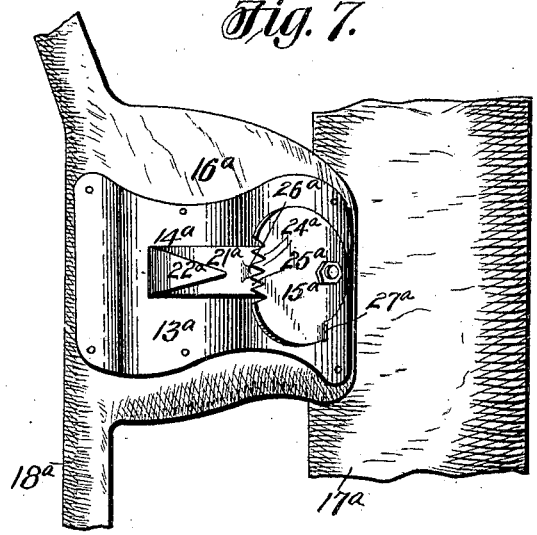
Fig. 7.
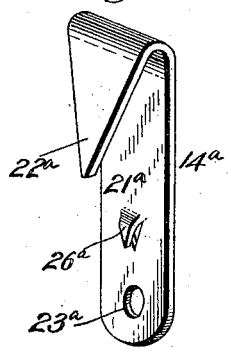
Fig. 9.
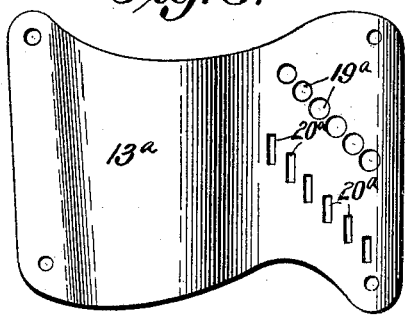
Fig. 8.
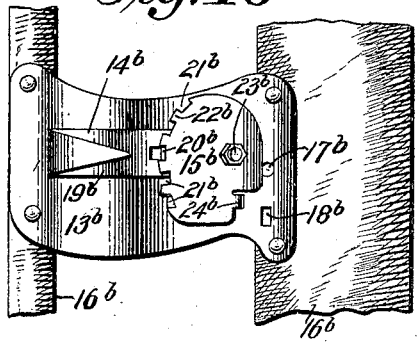
Fig. 10.
Fig. 11.
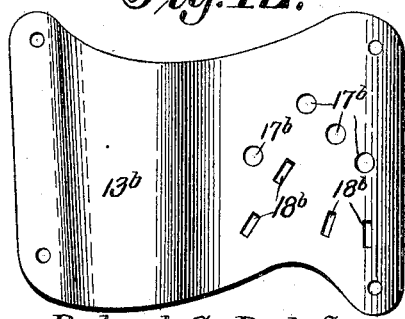
Fig. 12.
Robert G. Rate, Inventor
Witnesses
M. C. Lyddane.
B. G. Foster.
By C. G. Siggers
Attorney No. 821,962. PATENTED MAY 29, 1906.
R. G. RATE.
CORN HUSKER.
APPLICATION FILED OCT. 6, 1905.
3 SHEETS—SHEET 3.
Fig. 13.
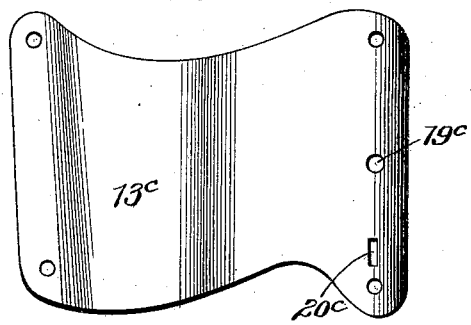
Fig. 14.
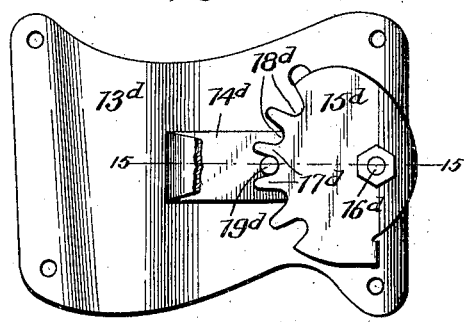
Fig. 15.
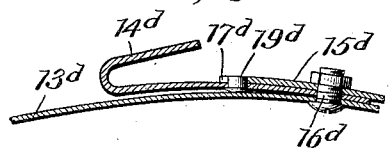
Fig. 16.
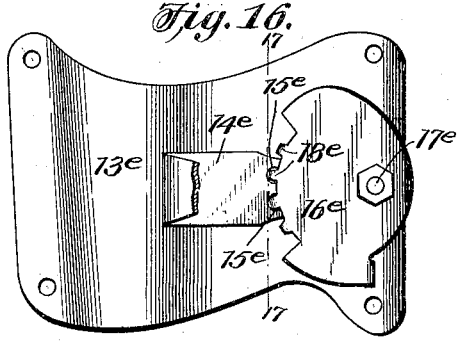
Fig. 18.
Fig. 17.
Fig. 19.
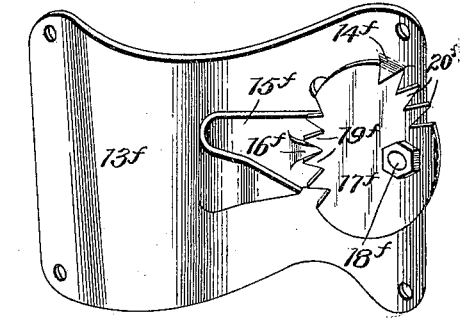
Fig. 20.
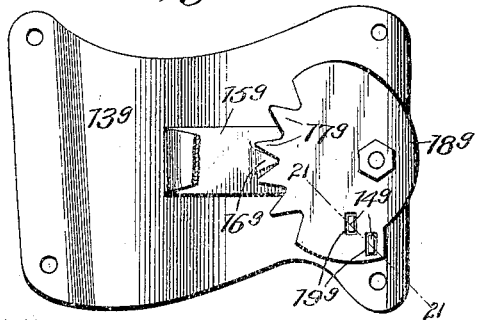
Fig. 21.
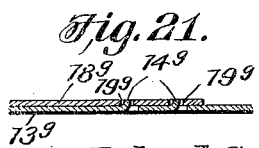
Robert G. Rate, Inventor
Witnesses
By
Attorney

UNITED STATES PATENT OFFICE.

ROBERT G. RATE, OF IOWA CITY, IOWA.

CORN-HUSKER.

No. 821,962.　　　Specification of Letters Patent.　　　Patented May 29, 1906.

Application filed October 6, 1905. Serial No. 281,664.

*To all whom it may concern:*

Be it known that I, ROBERT G. RATE, a citizen of the United States, residing at Iowa City, in the county of Johnson and State of Iowa, have invented a new and useful Corn-Husker, of which the following is a specification.

The present invention relates to improvements in that class of devices which are secured to the hand and are employed for stripping the husks from corn.

Experience has shown that different operators have distinctly different ideas as to the most satisfactory position of the husk-engaging hook with respect to the hand, and while these hooks have been made adjustable on their attaching and supporting means heretofore so far as I am aware the range of adjustment has been limited and no glove has been suited in this respect to all classes of workmen. Therefore the primary object in the present case has been to provide a novel and comparatively simple husker having a husk-engaging device that can be adjusted and held in a great variety of positions with respect to the hand to which such husker is applied, and thus can be placed in a position considered desirable and suitable by practically any operator. Moreover, the adjustment can be obtained with ease and expedition.

Several different embodiments of the invention are illustrated in the accompanying drawings and described in the following specification. An inspection of the claims will show, however, that the invention is not limited to the exact structure herein set forth, but is open to other changes and modifications.

In the drawings, Figure 1 is a view of a hand, showing one embodiment of the invention in place thereon. Fig. 2 is a longitudinal sectional view through such embodiment. Fig. 3 is a cross-sectional view. Fig. 4 is a detail view of the base-plate employed. Fig. 5 is a detail perspective view of the husk-engaging hook. Fig. 6 is a similar view of the holding-plate. Fig. 7 is a plan view of a slightly-modified form of construction. Fig. 8 is a detail view of the base-plate thereof. Fig. 9 is a perspective view of the hook. Fig. 10 is a plan view of still another modification. Fig. 11 is a longitudinal sectional view therethrough. Fig. 12 is a plan view of the base-plate. Fig. 13 is a plan view of a form of base-plate that is a slight modification of that disclosed in Fig. 8. Fig. 14 is a plan view of another modification of the invention. Fig. 15 is a sectional view therethrough on the line 15 15. Fig. 16 is a plan view of still another form of the invention. Fig. 17 is a detail sectional view on the line 17 17 of Fig. 16. Fig. 18 is a detail perspective view of the holding-plate employed in the structure shown in Fig. 16. Fig. 19 is a perspective view of another modified form of structure. Fig. 20 is still another modification. Fig. 21 is a sectional view on the line 21 21 of Fig. 20.

Similar reference-numerals designate corresponding parts in all the figures of the drawings.

Referring first to the embodiment illustrated in the first six figures, the husker consists of a base-plate 13, a husk-engaging device 14, and a holding device 15, together with suitable straps 16 and 17 for holding the same in place upon a hand. The base-plate 13 is formed of sheet metal that is bent to properly conform to the configuration of the palm of the hand contiguous to the wrist, and to its opposite ends are secured the wrist-strap 16 and the palm-strap 17. The said base-plate is provided with a diagonally-disposed slot 18, along one side of which is located a similarly-disposed series of sockets 19, these sockets and the slot being located at the end carrying the wrist-strap 16.

The husk-engaging device is in the form of a hook having a shank 20, that rests upon the base 13 and is provided near one end with a pivot-receiving opening 21, alined with the slot 18, while its other end is bent to form an outstanding nib having spaced pointed bills 22, two being shown, though more may be employed, if desired. Located upon the base and covering a portion of the shank 20 of the hook is the holding-plate 15, having an opening 23, alined with the opening 21 and being, furthermore, provided in one edge with a curved series of teeth 24, forming between them a plurality of sockets 25. The shank 20 has an upstanding tooth 26, struck integrally from said shank and being arranged to interfit with the teeth 24 or, in other words, engage in the sockets 25. A tooth 27, carried by the plate 15, is arranged to engage in the sockets 19. The three elements thus described are held together by a pivot-bolt 28, that passes through the slot 18 and the openings 21 and 23, said bolt having a nut 29, threaded on its outer end and bearing upon the plate 15.

The structure is applied to the hand in the ordinary manner, as illustrated in Fig. 1, and the hook has a wide range of adjustment upon the base-plate. This will be clearly evident when it is considered that the hook has a swinging movement on the pivot-bolt and can be held in a variety of positions with respect to the holding-plate 15, as the tooth 26 of said hook is adapted to engage in any of the sockets 25 of the holding-plate. Then, again, the pivot of the hook is adjustable upon the plate because of its engagement in the slot 18 thereof, so that the axis of swinging movement of the hook can be changed to different positions as desired. Finally, the holding-plate itself is adjustable, as will be apparent, so that no matter what position the pivot-bolt may be placed in the hook is still capable of adjustment on the pivot and can be held in the different positions. It will therefore be clear that the husk-engaging device can be adjusted bodily toward and from the thumb of the operator and can be locked in practically any position desired with respect thereto.

A slightly-different form of construction is illustrated in Figs. 7, 8, and 9. The base-plate is designated by the reference-numeral 13$^a$, the husk-engaging device by 14$^a$, and the holding-plate by 15$^a$. The base-plate in this instance is secured to a pad-lining 16$^a$, to which are secured the wrist and palm straps 17$^a$ and 18$^a$. In this embodiment the base-plate is provided with a series of diagonally-disposed pivot-openings 19$^a$ and with a parallel series of sockets 20$^a$. The husk-engaging device is in the form of a hook having a shank 21$^a$, provided with a single bill 22$^a$ and an opening 23$^a$, that can be alined with any of the openings 19$^a$. The holding-plate 15$^a$ has a series of teeth 24$^a$, forming sockets 25$^a$, in which the tooth 26$^a$ of the shank engages. The holding-plate 15$^a$, furthermore, has a tooth 27$^a$, that is arranged to engage in any of the sockets 20$^a$. A pivot-bolt 28$^a$ passes through the openings in the plate 15$^a$ and shank 21$^a$ and is adapted to pass through any of the openings 19$^a$. It will be evident that this embodiment of the invention has all the advantages of that above set forth with the one exception that a single bill is employed instead of a plurality of the same.

Still another embodiment is shown in Figs. 10, 11, and 12. In this structure a base-plate 13$^b$ is employed, together with a husk-engaging device 14$^b$ and a holding-plate 15$^b$. The plate 13$^b$ is secured to straps 16$^b$ and is provided in one end with a series of pivot-receiving openings 17$^b$ and sockets 18$^b$. The husk-engaging device 14$^b$ comprises a hook having a shank 19$^b$, provided with an upstanding tooth 20$^b$. The holding-plate 15$^b$ has a marginal series of sockets 21$^b$, formed between teeth 22$^b$, said sockets being arranged to receive the tooth 20$^b$. The parts are held together by a pivot-bolt 23$^b$, passing therethrough and through any of the openings 17$^b$. The plate 15$^b$ has a tooth 24$^b$, that engages in the sockets 18$^b$ and holds said plate against pivotal movement. In this structure also it will be seen that the hook has the same wide range of adjustment and that, therefore, the same advantageous features are present as in the foregoing embodiment.

In case it is desired to have the holding-plate and pivot not adjustable the base-plate 13$^c$ (illustrated in Fig. 13) may be employed, said plate having a single pivot-receiving opening 19$^c$ and a single socket 20$^c$, that receives the usual holding-tooth of the holding-plate.

A slight modification over what is shown in the first six figures is disclosed in Figs. 14 and 15. The base-plate is designated 13$^d$ and may be of the usual formation. The husk-engaging hook is shown at 14$^d$, a portion of the free end thereof being broken away. The holding-plate is illustrated at 15$^d$ and overlies the hook, the three elements being secured together by the usual pivot-bolt 16$^d$. One edge of the holding-plate is provided with a series of teeth 17$^d$, forming sockets 18$^d$ between them, and a tooth 19$^d$, carried by the hook, is arranged to engage in the sockets. By referring to Fig. 15 it will be observed that the tooth 19$^d$ is in the form of a headed stud removably passed through an opening in the hook-shank, the head being interposed between the shank and base-plate and the outer end of the stud engaging between the teeth 17$^d$.

Another type of the invention is disclosed in Figs. 16, 17, and 18. The base-plate 13$^e$ is of the usual formation, and located thereupon is a hook 14$^e$, the shank of which is provided with one or more openings 15$^e$. A holding-plate 16$^e$ overlies the shank and is held in place by a pivot-bolt 17$^e$, passing through the same, through the hook, and through the base-plate. The edge of the holding-plate is provided with a series of inwardly-turned teeth 18$^e$, and these teeth are arranged to engage in the openings 15$^e$ of the hook-shank, thus securely holding the hook in different positions.

In Fig. 19 there is disclosed still another modification. The base-plate 13$^f$ is provided with an outstanding tooth 14$^f$, and the hook 15$^f$ also has a tooth 16$^f$. The holding-plate 17$^f$ is secured in place by the pivot-bolt 18$^f$ and is provided at its edges with different sets of teeth 19$^f$ and 20$^f$, the former adjustably interlocking with the tooth 16$^f$ of the hook, the latter adjustably interlocking with the tooth 14$^f$ of the base-plate. The said holding-plate is thus adjustably held in place upon the base-plate, and the husk-engaging hook is adjustably engaged with the holding-plate.

Another form of the invention is illustrated in Figs. 20 and 21, wherein the base-plate is shown at 13ᵍ and is provided with upstanding teeth 14ᵍ. A husk-engaging hook 15ᵍ has a tooth 16ᵍ, that coöperates with the usual teeth 17ᵍ of the holding-plate 18ᵍ. This plate 18ᵍ is, furthermore, provided with sockets 19ᵍ, that receive the teeth 14ᵍ of the base-plate, which teeth thus prevent the movement of the holding-plate upon the base-plate.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a corn-husker, the combination with a base, of a husk-engaging device pivotally mounted thereon, and a device for holding the husk-engaging device against swinging movement, said husk-engaging device being movable to different positions with respect to the holding device and having an adjustable interfitting engagement with said holding device for maintaining the husk-engaging device in said different positions.

2. In a corn-husker, the combination with a base, of a husk-engaging device movably mounted thereon, and a device for holding the husking device against movement, one of said devices having a plurality of teeth, the other having a portion that adjustably interlocks with the teeth.

3. In a corn-husker, the combination with a base, of a husk-engaging device movably mounted thereon, and a device for holding the husking device against movement, one of said devices having a plurality of sockets, the other having a tooth that engages in the sockets to hold the husk-engaging device in different positions upon the base.

4. In a corn-husker, the combination with a base, of a husk-engaging device pivotally mounted thereon, and a device for holding the husk-engaging device against its pivotal movement, one of said devices having a circular series of teeth, forming sockets between them, the other having a tooth that is arranged to engage in said sockets between the teeth.

5. In a corn-husker, the combination with a base, of a husk-engaging device pivotally mounted thereon, a holding device secured against movement on the base, a plurality of sockets formed in the holding device, and a tooth carried by the husk-engaging device and arranged to engage in the sockets.

6. In a corn-husker, the combination with a base-plate, of a husk-engaging hook located thereon, a holding-plate overlying a portion of the hook and having an interlocking engagement with the base-plate, a bolt connecting the base-plate, the hook, and holding-plate, said holding-plate having a plurality of sockets, and an outstanding tooth carried by the hook and adjustably engaging in the sockets.

7. In a corn-husker, the combination with a base, of a husk-engaging device adjustably mounted thereon, a holding device for the husk-engaging device also adjustable on the base, said devices being furthermore adjustable with respect to each other, and a pivot-bolt for the husk-engaging device, said bolt also constituting means for securing the holding device to the base and being adjustable on said base.

8. In a corn-husker, the combination with a base, of a husk-engaging device adjustable thereon, a pivot for the husk-engaging device, a holding device, interlocking means for securing the devices against relative movement, and other means interlocking the base and holding device for maintaining the same against relative movement.

9. In a corn-husker, the combination with a base, of a husk-engaging device adjustable thereon, a holding device for the husk-engaging device adjustable with respect to the base and with respect to said husk-engaging device, a pivot-bolt for the husk-engaging device, said bolt also constituting means for securing the holding device to the base, and means interlocking the base and holding device for maintaining the same against relative movement.

10. In a corn-husker, the combination with a base, of a husk-engaging device adjustably mounted thereon, a holding device for the husk-engaging device, said holding device being adjustable with respect to the base and with respect to the husk-engaging device, a pivot for the husk-engaging device, said pivot also constituting means for securing the husk-engaging device to the base and being adjustable on said base, and means interlocking the base and holding device for maintaining the same against relative movement, said latter means being also adjustable to permit the holding device being secured in different positions on the base.

11. In a corn-husker, the combination with a base-plate having a plurality of sockets, of a husk-engaging hook having a shank that bears upon the base-plate, a holding-plate fitted over the shank of the hook and having a plurality of sockets, an upstanding tooth carried by the shank and being arranged to engage in the sockets, a pivot and holding-bolt passing through the holding-plate, the shank, and the base, and being adjustable to different positions in said base, and a holding-tooth for the holding-plate, said tooth engaging in the different sockets in the base.

12. In a corn-husker, the combination with a base, of a husk-engaging hook adjustable thereon, a holding device for the hook having one portion interlocked therewith, and another portion that interlocks with different parts of the base and a holding-bolt for the device engaging said device and the base and being adjustable to different positions in the latter.

13. In a corn-husker, the combination with a base, of a husk-engaging device mounted on the base, and a holding device also connected to the base, said husk-engaging and holding devices being provided, one with a series of sockets, the other with a tooth portion that is received in the different sockets to hold the husk-engaging device in different relations upon the base.

14. In a corn-husker, the combination with a base, of a husk-engaging device mounted on the base, and a holding device also connected to the base, said holding device having a series of teeth and the husk-engaging device having a portion that interfits therewith to hold said husk-engaging device in different relations upon the base.

15. In a corn-husker, the combination with a base, of a husk-engaging device mounted upon the base, and a holding device comprising a plate overlying the husk-engaging device, said husk-engaging device being adjustable to different positions with respect to the holding device and having an adjustable interfitting engagement therewith to hold said husk-engaging device in different relations upon the base and in different positions with respect to the holding device.

16. In a corn-husker, the combination with a base, of a husk-engaging device mounted upon the base, and a holding device comprising a plate overlying the husk-engaging device and having a plurality of teeth at one edge that interfit with a portion of the husk-engaging device to hold the same in different relations upon the base.

17. In a corn-husker, the combination with a base, of a husk-engaging device mounted thereon, a holding-plate having one portion adjustably interlocked with the device and another portion interlocked with the base, and means for securing the base, the device and the plate together.

18. In a corn-husker, the combination with a base, of a husk-engaging device mounted thereon, a holding-plate having teeth on one portion that adjustably interlock with the device and a tooth on another portion that interfits with the base, and a pivot-bolt securing the base, the husk-engaging device and the plate together, said device swinging upon the bolt.

19. In a corn-husker, the combination with a base, of a husk-engaging device, a holding device for the husk-engaging device, said husk-engaging device being adjustable with respect to the base and the holding device and having an adjustable engagement with the latter, and means connecting the base, the husk-engaging device and the holding device to secure the same against relative movement.

20. In a corn-husker, the combination with a base, of a husk-engaging hook, a holding-plate overlying the hook and having an engagement with the base at one side of the same, said hook and plate having an adjustable interlocking engagement with each other, and a pivot-bolt connecting the base, the hook, and the plate to secure the same against relative movement.

In testimony that I claim the foregoing as my own I have hereto affixed my signature in the presence of two witnesses.

ROBERT G. RATE.

Witnesses:
 FRED FRY,
 HARRY FRY.